United States Patent
Kojima et al.

(10) Patent No.: US 6,925,302 B2
(45) Date of Patent: Aug. 2, 2005

(54) MOBILE COMMUNICATION METHOD

(75) Inventors: Junichiroh Kojima, Tokyo (JP); Hitoshi Watanabe, Tokyo (JP)

(73) Assignee: NEC Corporation, Tokyo (JP)

( * ) Notice: Subject to any disclaimer, the term of this patent is extended or adjusted under 35 U.S.C. 154(b) by 246 days.

(21) Appl. No.: 10/442,925

(22) Filed: May 22, 2003

(65) Prior Publication Data
US 2003/0220108 A1 Nov. 27, 2003

(30) Foreign Application Priority Data
May 23, 2002 (JP) .......... 2002-149421

(51) Int. Cl.$^7$ .......... H04Q 7/20
(52) U.S. Cl. .......... 455/435.3; 455/452.1; 455/453; 455/438; 455/437; 455/512; 455/166.2
(58) Field of Search .......... 455/452.1, 450, 455/453, 439, 438, 437, 512, 509, 166.2, 150.1, 161.1, 410, 435.3

(56) References Cited

U.S. PATENT DOCUMENTS 5,226,071 A * 7/1993 Bolliger et al. .......... 455/435.3
6,327,472 B1 * 12/2001 Westroos et al. .......... 455/450
6,442,156 B1 * 8/2002 Carlstrom .......... 370/343
6,584,098 B1 * 6/2003 Dutnall .......... 370/354
6,845,086 B1 * 1/2005 Ayoub .......... 370/331

FOREIGN PATENT DOCUMENTS

JP          10-308978          11/1998

* cited by examiner

Primary Examiner—Sonny Trinh
Assistant Examiner—Marcos Torres
(74) Attorney, Agent, or Firm—Dickstein, Shapiro, Morin & Oshinsky, L.L.P.

(57) ABSTRACT

In a mobile terminal communication method, when a zone in which a mobile terminal is positioned becomes in a congestion state, a calling channel having high emergency can be secured. A connection priority rank is given to each mobile terminal. When an area in which a calling mobile terminal is positioned is in the congestion state, the number of currently-used calling channels in the same connection priority rank as that of the mobile terminal is compared with the number of the calling channels set to the rank. Depending on its result, the call is disconnected or another mobile terminal in a low connection priority rank is handed off to another area.

9 Claims, 10 Drawing Sheets

| TELEPHONE NUMBER | MOBILE TERMINAL INHERENT NUMBER | POSITION IN AREA | SUBSCRIBER NAME | CONNECTION PRIORITY RANK | NUMBER OF CALLING CHANNELS | B2-1 CONGESTION CONDITION | B2-2 CONGESTION CONDITION |
|---|---|---|---|---|---|---|---|
| 090-1234-5671 ... 090-1234-5675 | 123456781 ... 123456785 | ZONE 4-1 SECTOR 4-1-11 | FIRE STATION F₁ | 1 | 5 | | |
| 090-1234-5681 ... 090-1234-5685 | 123456791 ... 123456795 | ZONE 4-7 SECTOR 4-7-14 | FIRE STATION F₂ | 1 | 5 | | |
| 090-9876-5431 ... 090-9876-5433 | 987654321 ... 987654323 | ZONE 4-4 SECTOR 4-4-13 | GAS COMPANY G | 2 | 3 | USABLE CALLING CHANNELS ARE ALL IN USE. | USABLE CALLING CHANNELS ARE ALL IN USE |
| 090-9876-5421 ... 090-9876-5423 | 987654331 ... 987654333 | ZONE 4-8 SECTOR 4-4-12 | ELECTRIC POWER COMPANY E | 2 | 3 | | |
| | | 4-1～4-8 | GENERAL SUBSCRIBER | 4 | 100 | | |

FIG.6

| BASE STATION | SECTOR NUMBER | CALLING CHANNEL NUMBER | USED TELEPHONE NUMBER | GROUP NAME | CONNECTION PRIORITY RANK | CONNECTED TELEPHONE NUMBER | CONGESTION |
|---|---|---|---|---|---|---|---|
| 3-1 | 4-1-11 | 3-1-1 | 090-1234-5671 | FIRE STATION F₁ | 1 | ○○○○○○ | CONGESTED(1) |
| | 4-1-12 | | | | | | NOT CONGESTED(0) |
| | 4-1-13 | | | | | | 0 |
| | 4-1-14 | | | | | | 0 |
| | 4-1-15 | | | | | | 0 |
| | 4-1-16 | | | | | | 0 |
| 3-2 ~ 3-4 | 4-2-11 ~ 4-4-16 | ... | ... | ... | ... | ... | ... |

CONGESTED(1)
NOT CONGESTED(0)

| TELEPHONE NUMBER | MOBILE TERMINAL INHERENT NUMBER | POSITION IN AREA | SUBSCRIBER NAME | CONNECTION PRIORITY RANK | AGREED NUMBER OF CALLING CHANNELS | B2-1 CONGESTION CONDITION | B2-2 CONGESTION CONDITION |
|---|---|---|---|---|---|---|---|
| 090-1234-5671 ⋮ 090-1234-5675 | 123456781 ⋮ 123456785 | ZONE 4-1 | FIRE STATION F₁ | 1 | 5 | | |
| 090-1234-5681 ⋮ 090-1234-5685 | 123456791 ⋮ 123456795 | ZONE 4-7 | FIRE STATION F₂ | 1 | 5 | | THE REMAINING NUMBER OF CALLING CHANNELS IS 5. |
| 090-9876-5431 ⋮ 090-9876-5433 | 987654321 ⋮ 987654323 | ZONE 4-4 | GAS COMPANY G | 2 | 3 | THE REMAINING NUMBER OF CALLING CHANNELS IS 5. | |
| 090-9876-5421 ⋮ 090-9876-5423 | 987654331 ⋮ 987654333 | ZONE 4-8 | ELECTRIC POWER COMPANY E | 2 | 3 | | |

FIG.9

| ZONE NAME | BASE STATION | CALLING CHANNEL NUMBER | USED TELEPHONE NUMBER | GROUP NAME | CONNECTION PRIORITY RANK | CONNECTED TELEPHONE NUMBER | REMAINING NUMBER OF CALLING CHANNELS |
|---|---|---|---|---|---|---|---|
| 4-1 | 3-1 | 3-1-1 | 090-1234-5671 | FIRE STATION $F_1$ | 1 | ○○○○○○ | ○○○ |
| 4-2 | 3-2 | 3-2-1 | 090-1234-5678 | GENERAL U | 4 | ×××××× | |
| 4-3 | 3-3 | 3-3-1 | 090-1234-5688 | GENERAL U | 4 | △△△△△△ | |
| 4-4 | 3-4 | 3-4-1 | 090-9876-5431 | GAS COMPANY G | 2 | ○×○×○× | |

FIG.10

MOBILE COMMUNICATION METHOD

BACKGROUND OF THE INVENTION

1. Field of the Invention

The present invention relates to a mobile communication system. More specifically, the present invention relates to a mobile communication system which limits use of a calling channel when congestion occurs.

2. Description of the Related Prior Art

Figure 1:
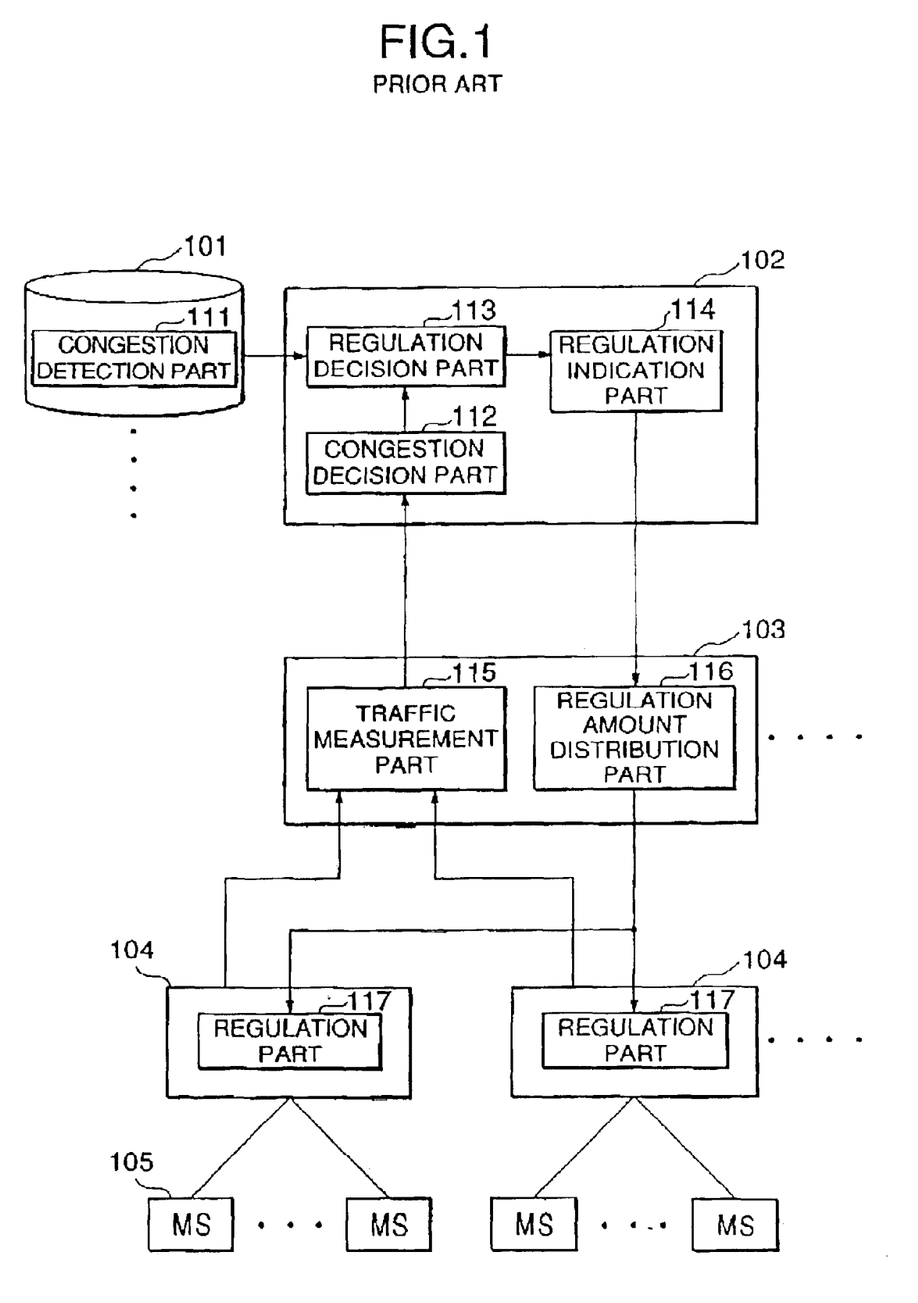
FIG. 1 is a block diagram showing an example of a mobile communication system.

Current mobile communication systems have mobile terminals, base stations communicating with the mobile terminals, a home memory managing position information of the mobile terminals, and an exchange station transmitting a call to a public telephone network. In general, due to a disaster or an accident, the number of calls may be temporarily increased abruptly from a certain area. In such case, congestion occurs in the mobile communication system to cause confusion in the network. Japanese Patent Application Laid-Open No. Hei 10-308978 discloses an example of a mobile communication system regulating a call in the above case. Referring to FIG. 1, the mobile communication system has a traffic controller 102 with a home memory 101, a mobile communication exchanger 103, base stations 104, and a plurality of mobile terminals 105. The base station 104 has a regulation part 117 regulating a call from the mobile terminal 105. A traffic measurement part 115 of the mobile communication exchanger 103 measures the number of accesses to transmit it to the traffic controller 102. The home memory 101 stores information of the mobile terminal. A congestion detection part 111 accesses the home memory 101 to detect congestion. A regulation decision part 113 decides the base station regulated based on the detected result. A regulation indication part 114 calculates a regulation amount to send it to the targeted mobile communication exchanger 103. A regulation amount distribution part 116 distributes the regulation amount to the base station 104 at a predetermined rate. The regulation part 117 of the base station 104 regulates the call from the mobile terminal 105 at the notified rate.

In the mobile communication system, however, the regulation part 117 automatically disconnects the call at the predetermined rate. An emergency call may be disconnected.

SUMMARY OF THE INVENTION

In a first specific example of a mobile communication method of the present invention, a connection priority rank is set to each mobile terminal to be stored. When an area in which a calling mobile terminal is positioned is in a congestion state and the number of currently-used calling channels in the same connection priority rank as that of the mobile terminal is equal to or larger than the number of calling channels set to the rank, the call is disconnected. When the number of currently-used calling channels in the same connection priority rank as that of the mobile terminal is smaller than the number of calling channels set to the rank, the rank in which the number of currently-used calling channels is larger than the set number of calling channels of the respective connection priority ranks of the area is searched for, the mobile terminal in the rank is handed off to another area, and a calling channel is allocated to the calling mobile terminal.

In a second specific example of the mobile communication method of the present invention, a connection priority rank is set to each mobile terminal to be stored. When a calling mobile terminal belongs to the highest connection priority rank, a calling channel is allocated to establish a call. When a base station which has received a call is in a congestion state and the mobile terminal belongs to the lowest connection priority rank, the call is disconnected. Then, when a base station which is adjacent the base station and is not in the congestion state is searched for and there is no corresponding base station, the call is disconnected. When there is the corresponding base station, use of an available channel of the base station is permitted. When there is no available channel, a calling channel of the mobile terminal having the longest call in a zone of the base station is allocated to the call.

The above-mentioned mobile communication methods can reduce the number of cases of disconnecting a mobile terminal whose connection priority rank is high when congestion occurs.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Figure 2:
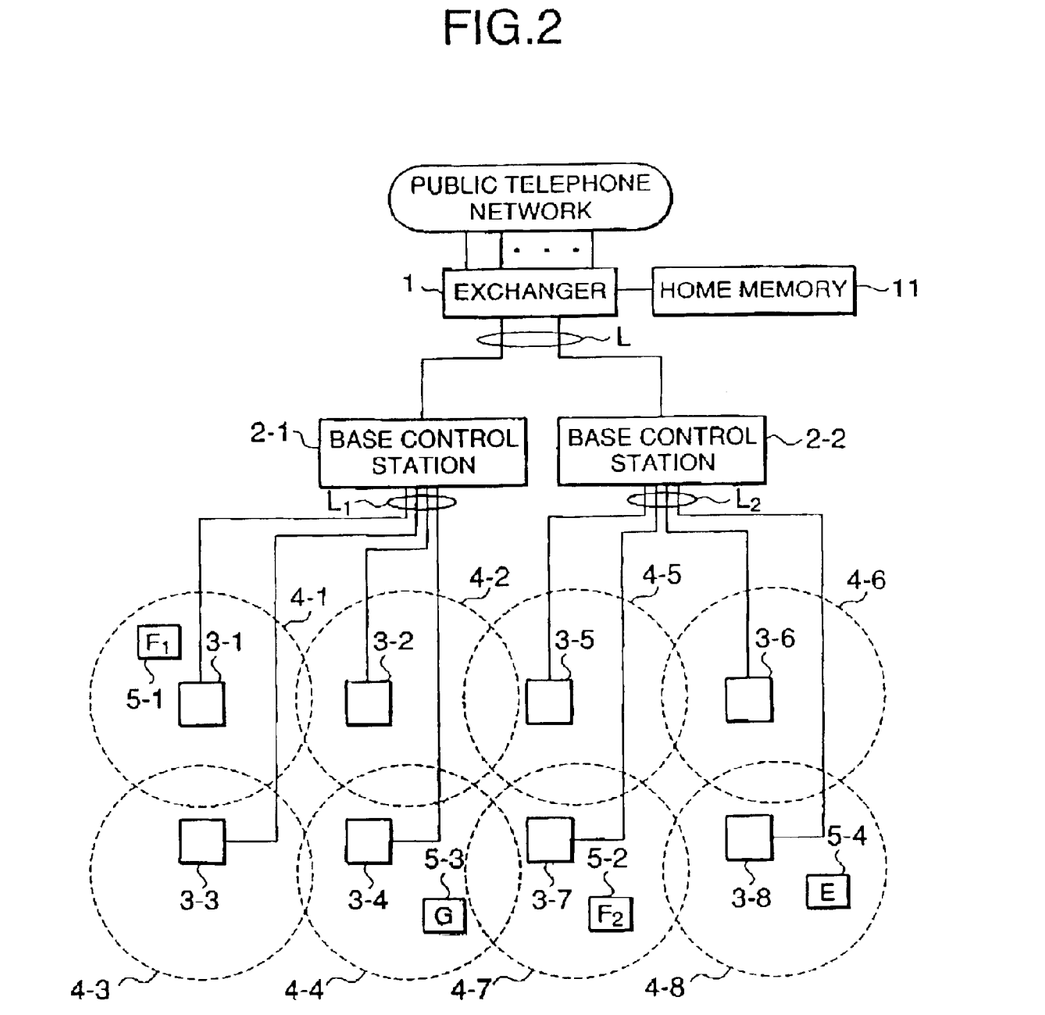
FIG. 2 is a block diagram showing a specific example of a mobile communication system executing a mobile communication method of the present invention.

Referring to FIG. 2, a specific example of a mobile communication system has an exchanger 1 connected to a public telephone network, base control stations 2-1, 2-2 controlling a call, and base stations 3-1 to 3-8 receiving a call from mobile terminals in predetermined wireless zones 4-1 to 4-8. In this example, the zones 4-1, 4-7 have fire stations 5-1, 5-2, respectively. The zone 4-4 has a gas company 5-3. The zone 4-8 has an electric power company 5-4. The exchanger 1 is connected to a home memory 11 storing information such as connection priority ranks and the set number of calling channels of subscribers including the fire stations, gas company and electric power company. In a congestion state, the base control stations 2-1, 2-2 secure the set number of calling channels of the fire stations 5-1, 5-2, the gas company 5-3, and the electric power company 5-4 to control calling so as to connect these calls in a priority manner.

Figure 3:
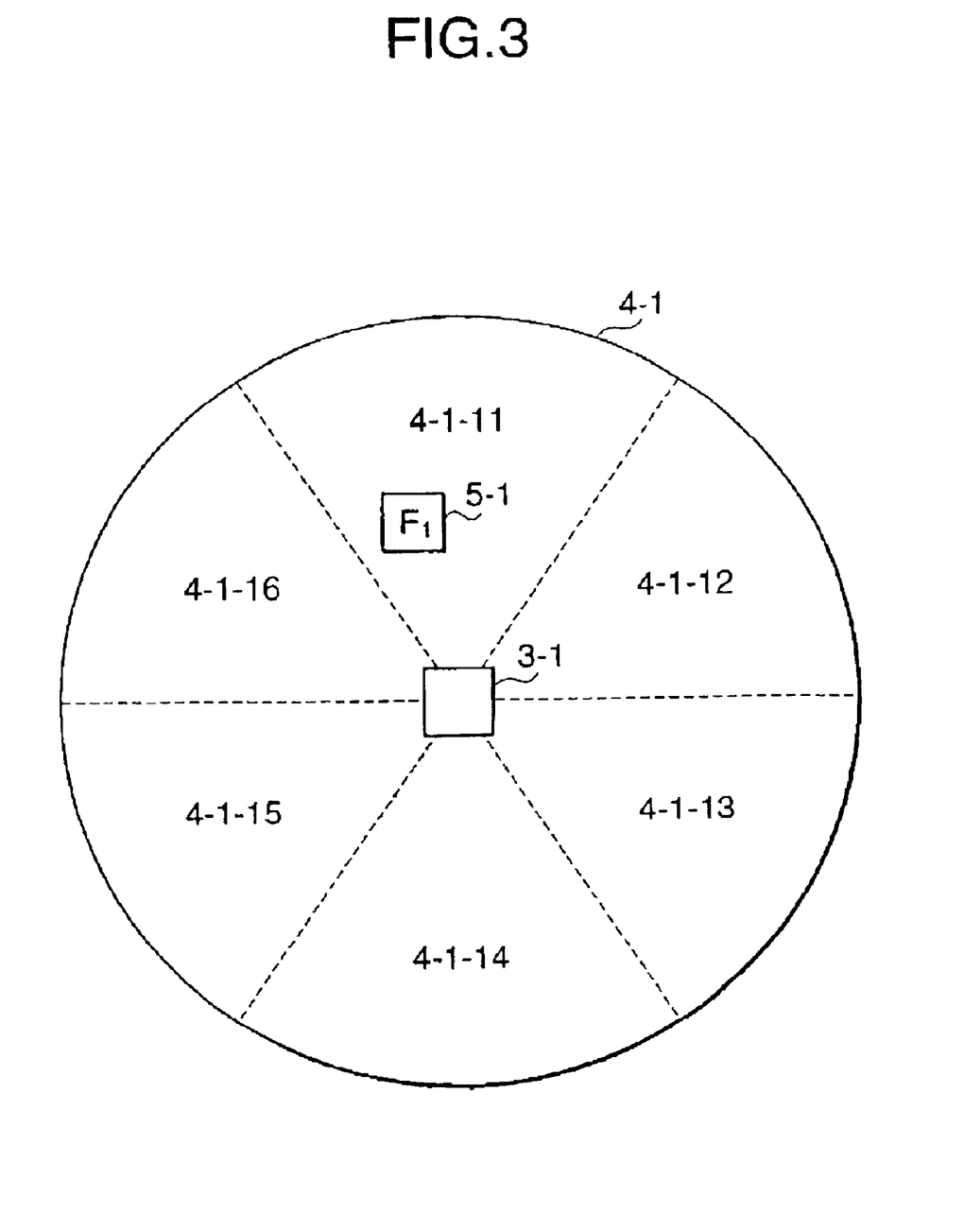
FIG. 3 shows an example of the structure of a zone of a base station.

Referring to FIG. 3, the zone of the base station in the system in the specific example has six areas called a sector. The base station 3-1 has six antennas having directivity. The six antennas can independently communicate with the mobile terminals in sectors 4-1-11 to 4-1-16.

Figure 4:
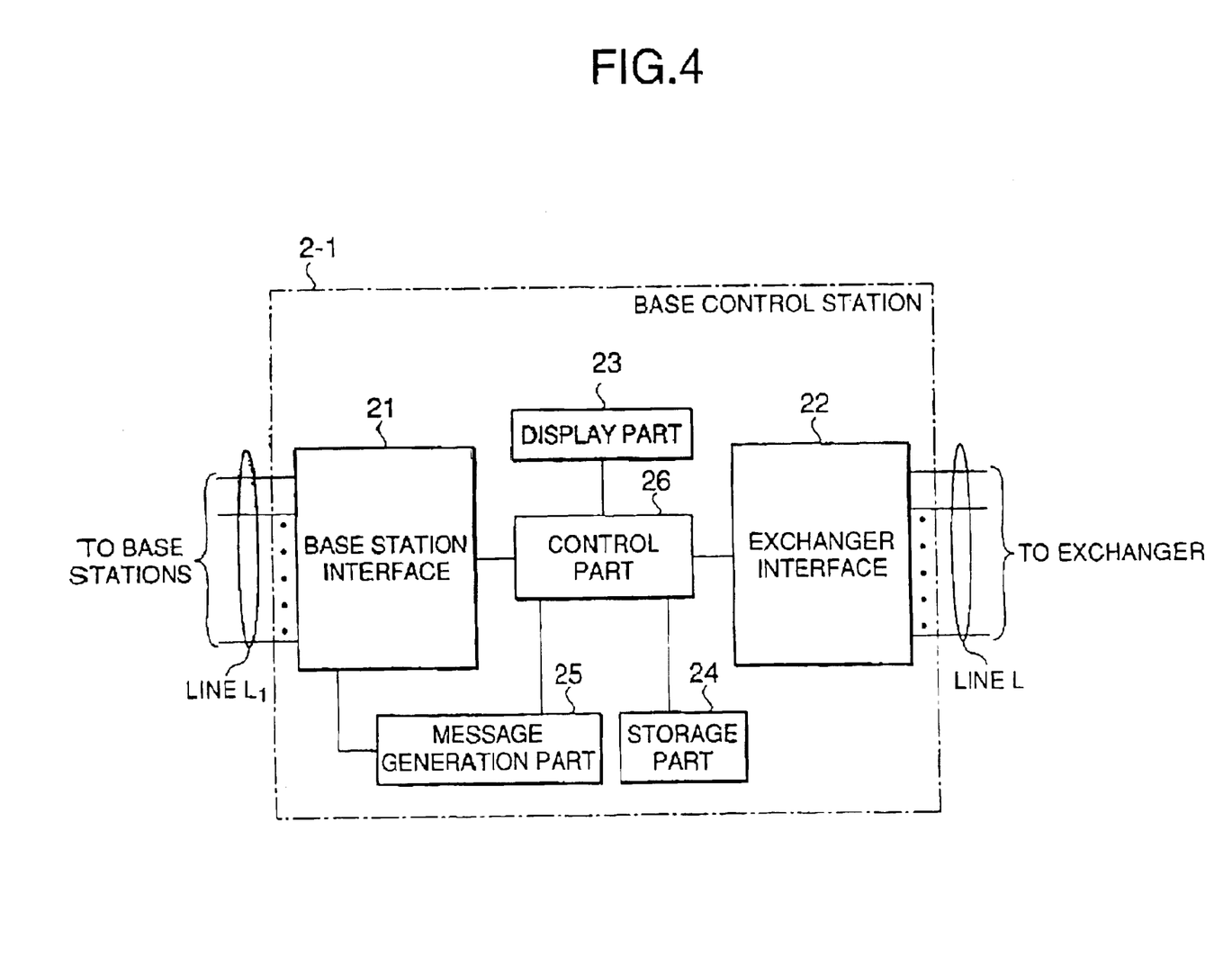
FIG. 4 is a block diagram of a specific example of a base control station.

Referring to FIG. 4, the base control station 2-1 has a base station interface 21, an exchanger interface 22, a display part 23, a storage part 24, and a message generation part 25. The display part 23 displays the usage state of the calling channel in real time. The sector in the congestion state can be displayed in red color. The storage part 24 stores the usage state of the calling channel of the base station controlled by the base control station 2-1. When congestion occurs in a certain sector of the zone of the base station, the message generation part 25 generates a predetermined voice message and character message under the control of a control part 26 to send the message to the caller of the sector using a control channel. The control part 26 performs control of connection and disconnection about a call inputted/outputted to/from the base control station 2-1.

Figure 5:
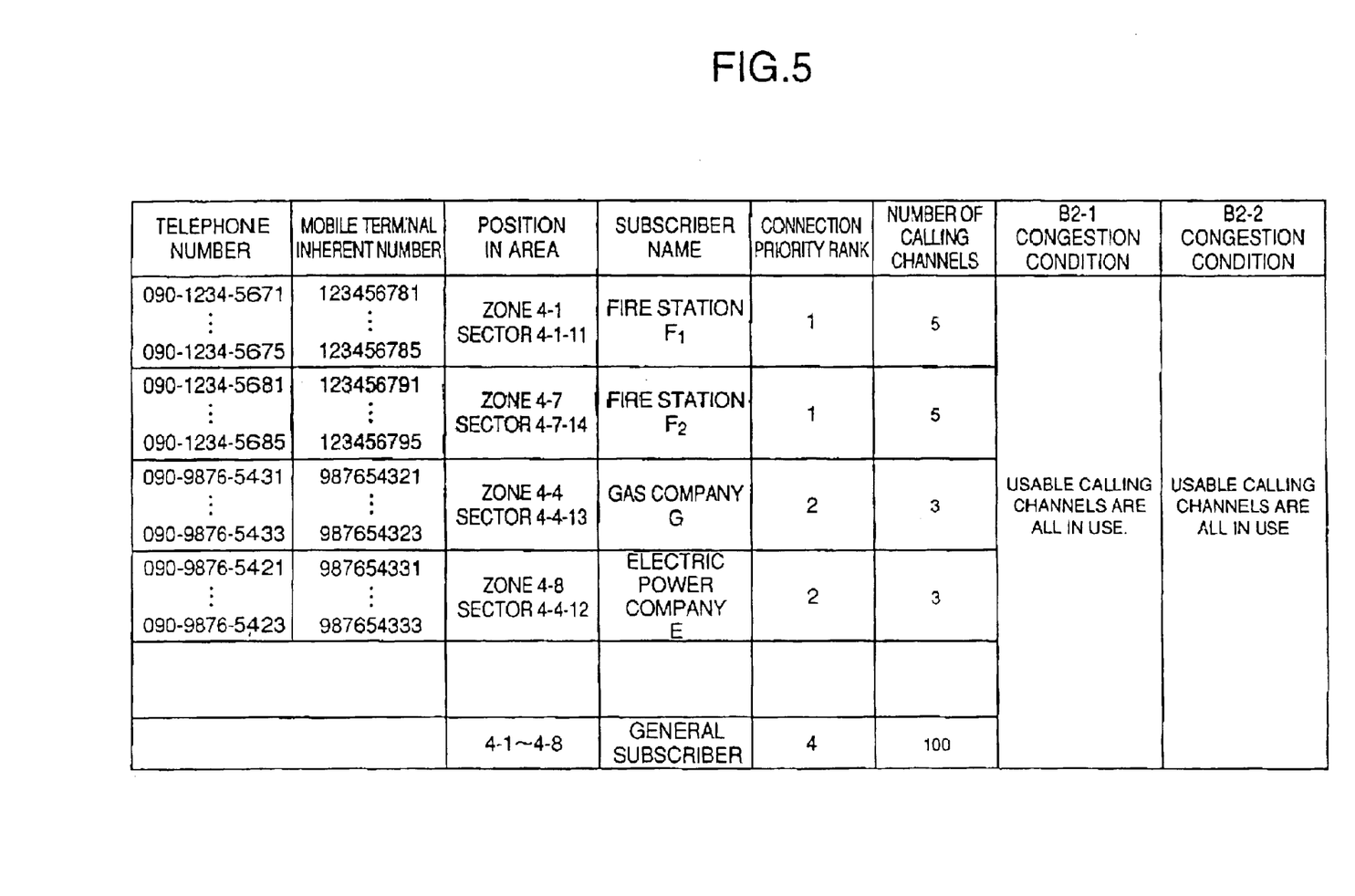
FIG. 5 shows a specific example of data of a home memory.

Referring to FIG. 5, the home memory 11 includes data about connection priority ranks and the number of calling channels set to mobile terminals (subscribers). High connection priority ranks are set to the fire stations, gas company, and electric power company performing high priority communication based on an agreement. In this example, the highest connection priority rank is set to the fire stations, the next rank is set to the gas company, and the rank after next is set to the electric power company. General subscribers are set to the lowest priority rank. The data such as the telephone numbers and inherent numbers of the mobile terminals, areas in which the mobile terminals are currently positioned, and conditions deciding congestion are stored. In this example, when the currently-usable calling channels are all in use in each of the sectors of the respective base stations controlled by the base control station 2-1, the sector is decided to be in the congestion state. When a calling channel cannot be used due to interference of an illegal electric wave, the calling channel is decided to be in use.

Figure 6:
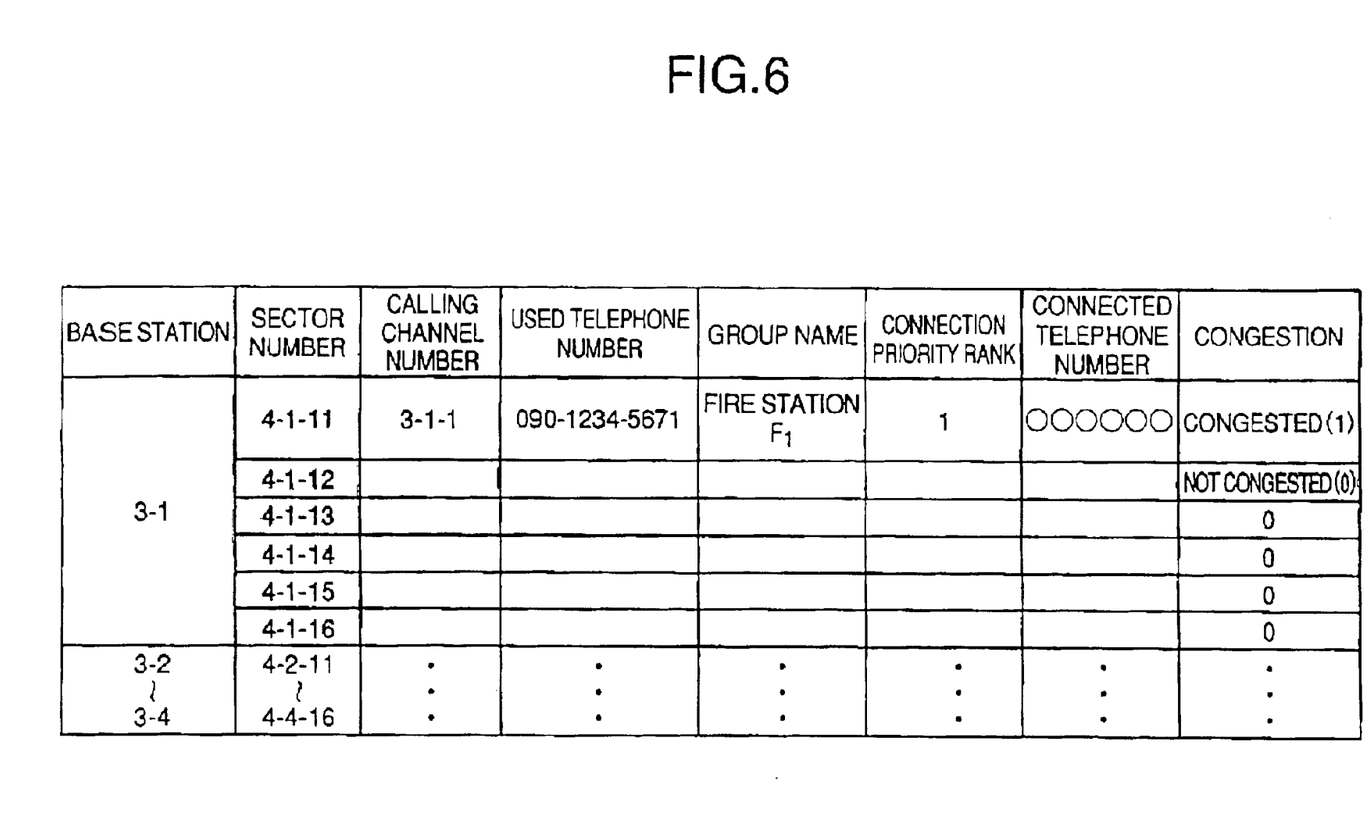
FIG. 6 shows a specific example of data of calling channels during calling stored in a storage part of the base control station.

Referring to FIG. 6, the storage part 24 in the base control station 2-1 stores that the fire station 5-1 whose connection priority rank is highest (1) is using a calling channel number 3-1-1 in the sector 4-1-11 of the zone 4-1 of the base station 3-1. The storage part 24 also stores that of whether the respective sectors are in the congestion state or not. The contents of the storage part 24 can be displayed on the display part 23. The display part 23 can display the sector in the congestion state, for example, in red color. The control part 26 performs control of a call depending on the stored contents of the storage part 24.

Figure 7:
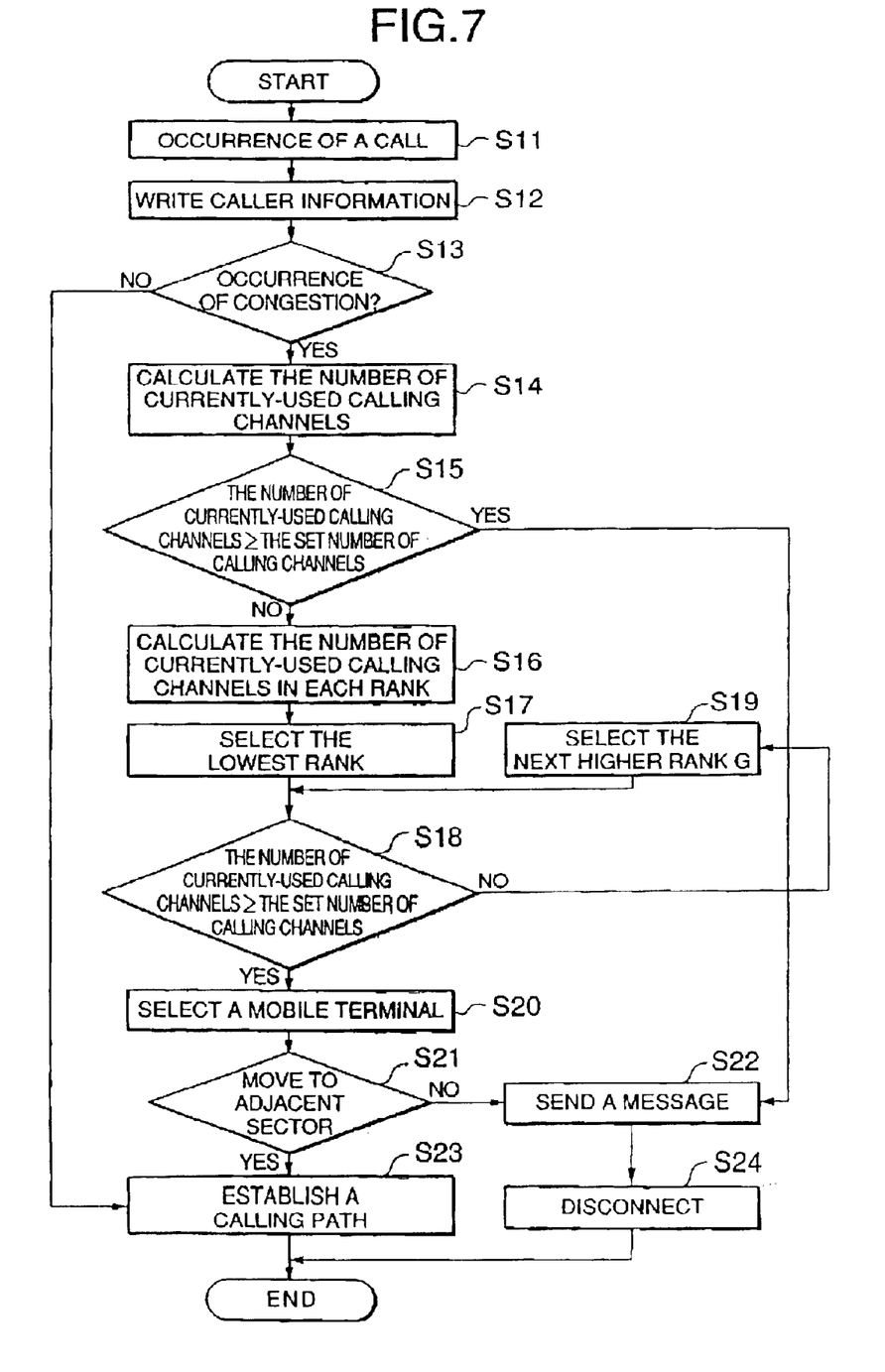
FIG. 7 is a flowchart showing a specific example of operation at congestion.

Referring to FIG. 7, a flowchart showing a specific example of operation of transmission regulation at congestion is shown, In this example, the total number of calling channels at normal in one sector is larger than the total number of calling channels set to organizations, companies, and general subscribers in the sector. When the total calling channels at normal are all in use, or other calling channels except for the calling channels unusable due to an illegal electric wave are all in use, the sector is decided to be in the congestion state. In this example, the sector is decided to be in the state shown in FIGS. 5, 6.

The control part 26 of the base control station detects a call via the base station interface part 21 (S11). The control part 26 stores information of the caller shown in FIG. 6 to the storage part 24 based on received information (S12). At this time, the connection priority rank of the caller is detected to be stored. The control part 26 checks whether a sector in which the caller is positioned is in the congestion state or not (S13). When the sector is not in the congestion state (No of S13), the control part 26 allocates a calling channel to the base station controlling the sector to establish a calling path (S23). When the sector is in the congestion state (Yes of S13), the control part 26 calculates the currently-used calling channels in the connection priority rank of the caller based on the information of the storage part 24 (S14). The number of calling channels set in the connection priority rank of the caller is checked based on the information of the home memory 11 (S15). When the number of currently-used calling channels is equal to or larger than the set number of call channels (Yes of S15), the control part 26 starts the message generation part 25 to generate a message of the congestion state, and sends it to the caller via the control channel (S22) to disconnect the call (S24). When the number of currently-used calling channels is smaller than the set number of calling channels (No of S15), the control part 26 calculates the number of currently-used calling channels for each connection priority rank in the same sector based on the information of the storage part 24 (S16). The lowest connection priority rank is selected (S17). When deciding, in the connection priority rank, that the calling channels in number equal to or larger than the set number of calling channels are currently used (Yes of S18), one mobile terminal in the connection priority rank is selected (S20). When the number of currently-used calling channels is smaller than the set number of calling channels (No of S18), the next higher connection priority rank is selected (S19) to perform the S18. When the mobile terminal can be handed off to an adjacent sector (Yes of S21), the control part 26 allocates a calling channel to the caller to establish a calling path (S23). When the selected mobile terminal cannot be handed off to the adjacent sector (No of S21), the control part 26 starts the message generation part 25 to generate a message of the congestion state, and sends it to the selected mobile terminal via the control channel (S22) to disconnect the call of the mobile terminal (S24).

As described above, in the mobile communication method of the specific example, when a call occurs in the sector in the congestion state, the base control station searches for the connection priority rank in which the channels in number equal to or larger than the set number of calling channels are used in the sector to hand off the caller (mobile terminal) in the rank to the calling channel of the adjacent sector. A call from the fire station in the sector in the congestion state can always secure the calling channel.

Figure 8:
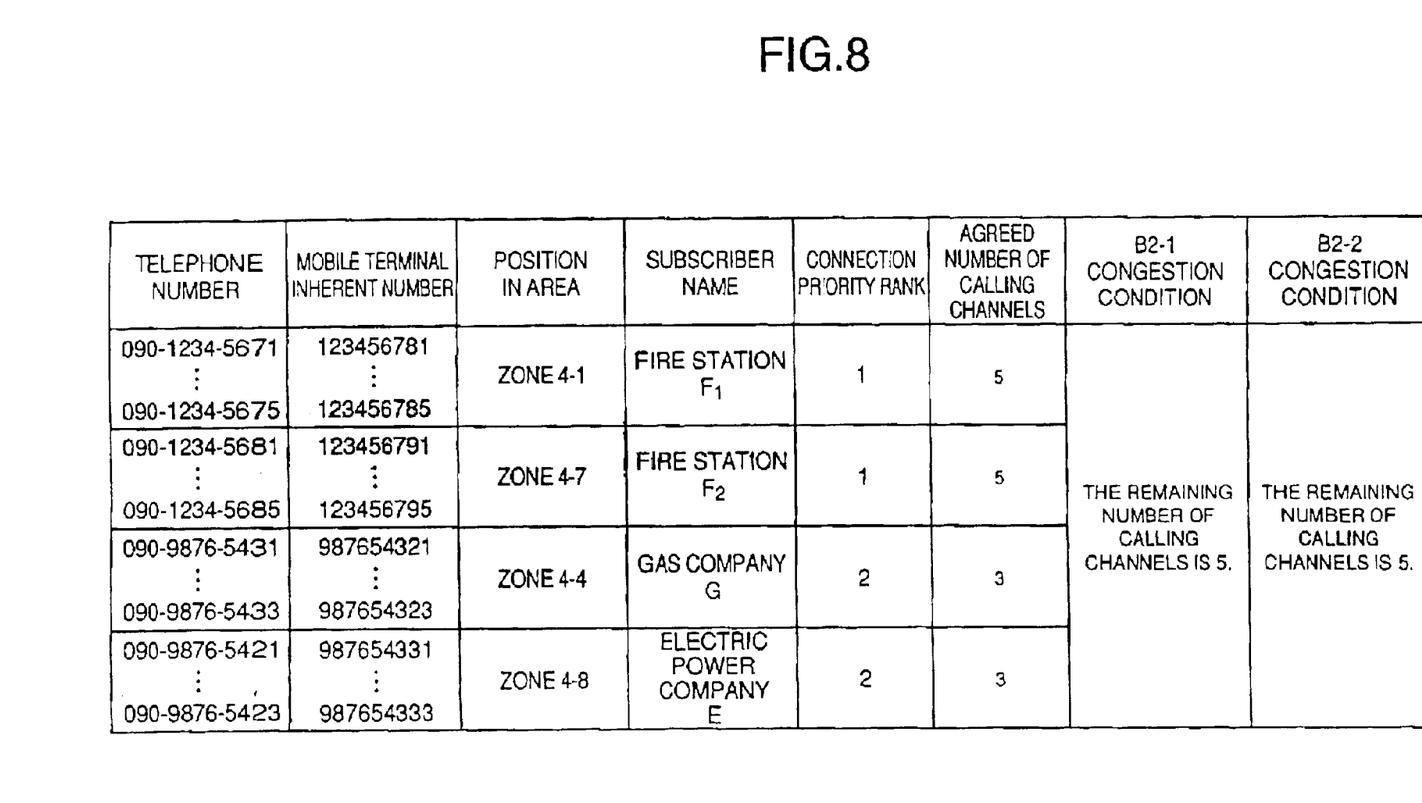
FIG. 8 shows another specific example of data of the home memory.

A second specific example of the mobile communication method will be described. The second specific example is also executed in the mobile communication system shown in FIGS. 2, 4. FIG. 8 shows a specific example of data of the home memory of the second specific example. Data is basically the same as that shown in FIG. 5. In this specific example, however, the zone of the base station is not divided for each sector. Also in this specific example, when other calling channels except for the number of calling channels of 5 set to the fire station in the highest connection priority rank in the zone of each of the base stations are all in calling, the zone is decided to be in the congestion state.

Figure 9:
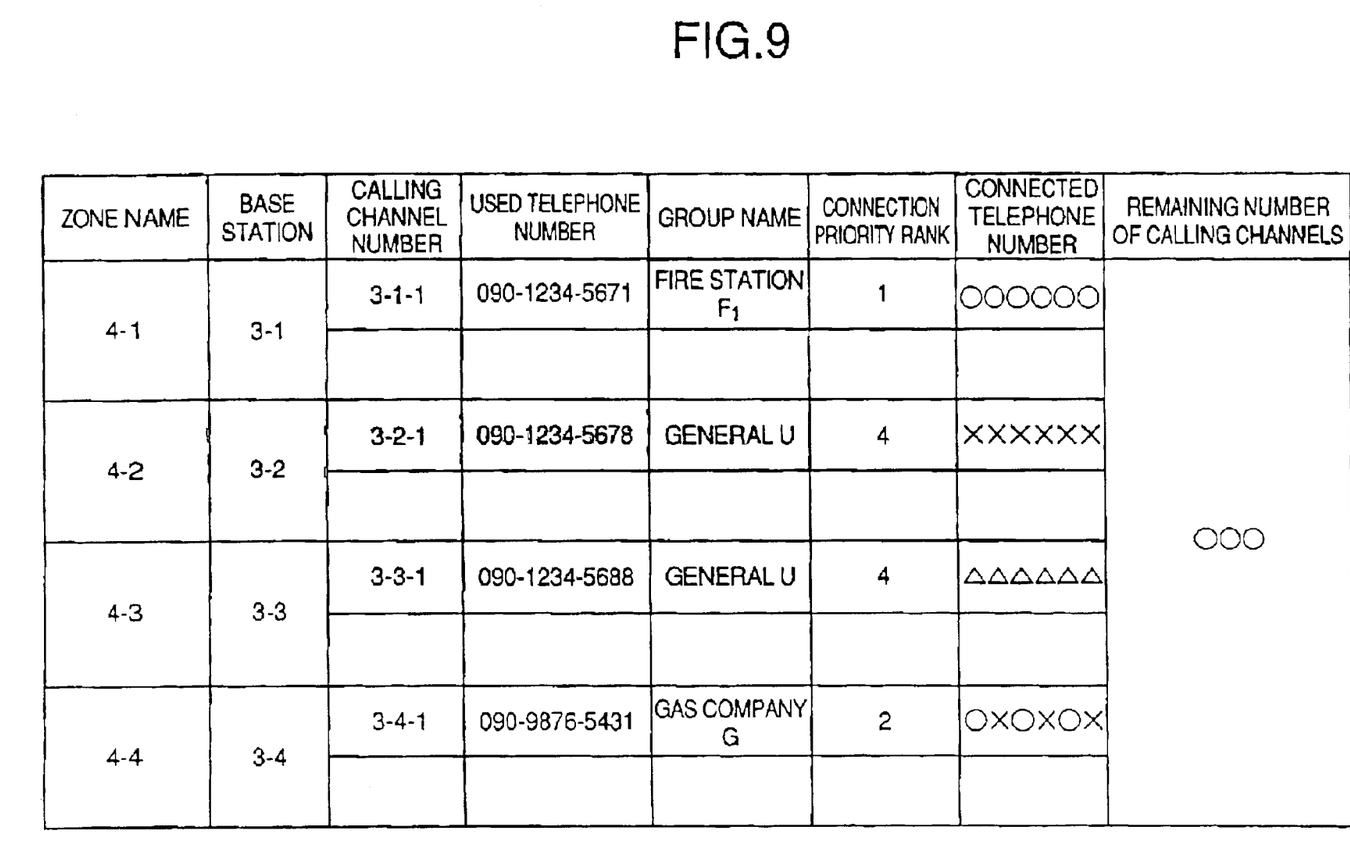
FIG. 9 shows another specific example of data of calling channels during calling stored in the storage part of the base control station.

Referring to FIG. 9, a specific example of data stored in the storage part 24 of the base control station is described. The storage part 24 stores that the fire station whose connection priority rank is the highest in the zone 4-1 of the base station 3-1 is using the calling channel number 3-1-1. The storage part 24 stores the remaining number of calling channels of the zones to decide congestion.

Figure 10:
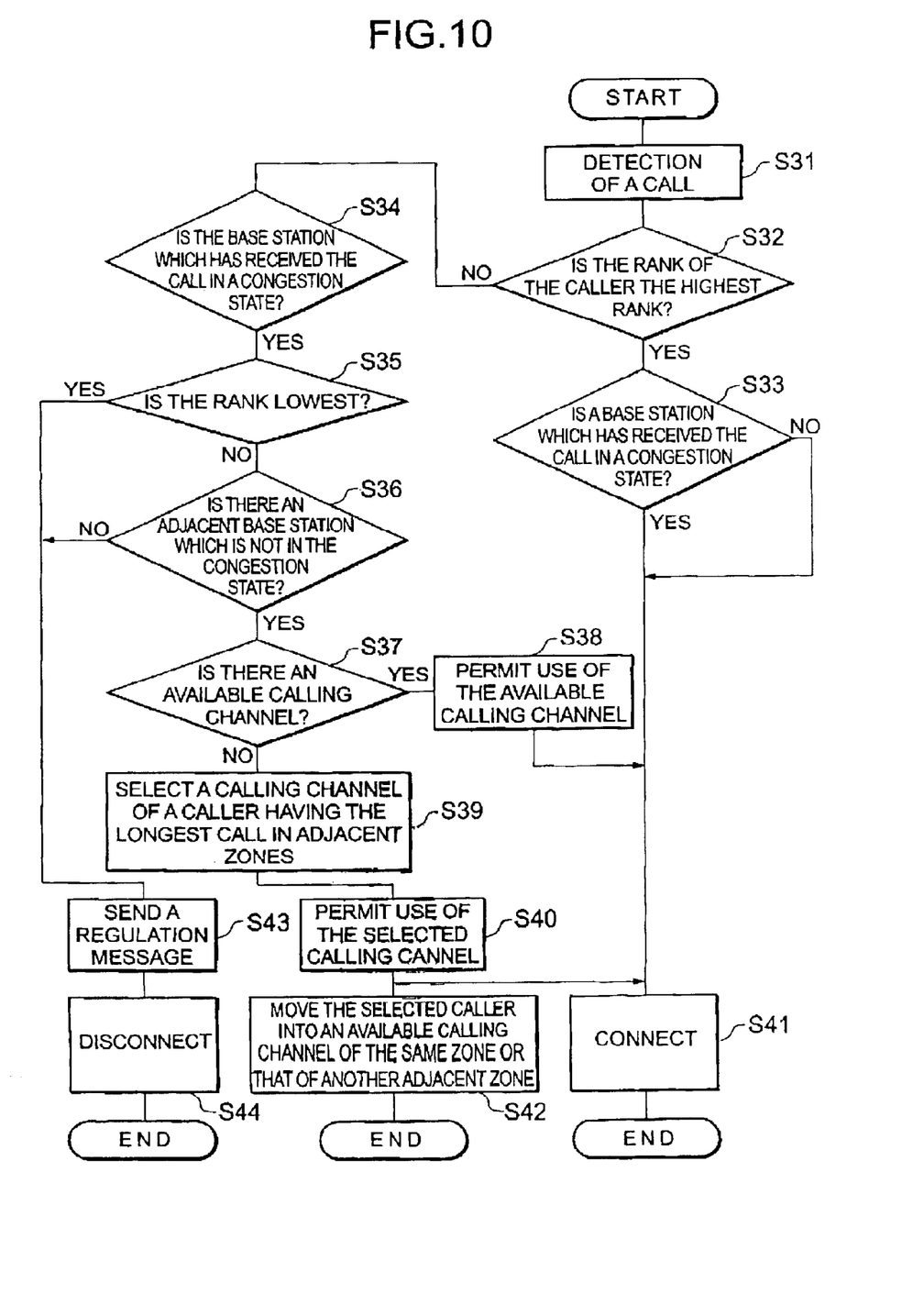
FIG. 10 is a flowchart showing another specific example of operation at congestion.

Referring to FIG. 10, a flowchart of operation of transmission regulation at congestion of the second specific example is shown. The control part 26 of the base control station detects a call via the base station interface part 21 (S31). The control part 26 accesses the home memory 11 connected to the exchanger 1 to identify whether the connection priority rank of the call is the highest rank or not (S32). When the connection priority rank of the call is the highest rank (Yes of S32), the control part 26 refers to the data of the storage part 24 to decide whether the base station which has received the call is in the congestion state or not (S33). When the base station is in the congestion state (Yes of S33) and is not in the congestion state (No of S33), connection is permitted (S41). This is because the call has the highest connection priority rank. The S33 can thus be omitted. When the control part 26 identifies that the connection priority rank of the call is not the highest rank (No of S32), the control part 26 decides whether the base station which has received the call is in the congestion state or not (S34). When the base station is not in the congestion state, the control part 26 permits use of an available calling channel to permit calling connection (S41). When the base station is in the congestion state (Yes of S34), the control part 26 decides whether the call is a call in the lowest connection priority rank or not (S35). When the call is in the lowest connection priority rank (Yes of S35), the control part 26 sends a message that the calling channel is in the congestion state to the caller via the control channel (S43) to disconnect the call (S44). When the call is not a call in the lowest rank (No of S35), the control part 26 decides whether there is an adjacent base station which is not in the congestion state based on the data of the storage part 24 (S36). When there is not the adjacent base station which is not in the congestion state (No of S36), the call is processed as in the above-mentioned call in the lowest connection priority rank. When there is the adjacent base station which is not in the congestion state (Yes of S36), the control part 26 decides based on the data of the storage part 24 whether there is an available calling channel in the adjacent base station (S37). When there is the available calling channel in the adjacent base station (Yes of S37), the control part 26 permits use of the available calling channel (S38) to permit calling connection (S41). When there is not the available calling channel in the adjacent base station (No of S37), the control part 26 selects a calling channel having the longest call in the zone of the base station (S39) to permit use of the calling channel to the caller (S40). The caller of the calling channel is moved into the available calling channel of the same zone or that of the adjacent base station (S42).

In the second specific example, the number of calling channels set to a subscriber having the highest connection priority rank (for example, the fire station) can always be secured. When the congestion state occurs at a disaster, the subscriber can make a call. The number of calling channels of a subscriber in the second priority connection rank can be secured likewise.

While the present invention has been described in connection with certain preferred embodiments, it is to be understood that the subject matter encompassed by the present invention is not limited to those specific embodiments. On the contrary, it is intended to include all alternatives, modifications, and equivalents as can be included within the spirit and scope of the following claims.

What is claimed is:

1. A mobile terminal communication method comprising the steps of:
    (a) setting a connection priority rank for each mobile terminal to store the same;
    (b) deciding whether an area in which a first calling mobile terminal is positioned is in a congestion state or not;
    (c) when not being in the congestion state, allocating a calling channel to establish calling; and
    (d) when being in the congestion state,
        (d-1) when the number of currently-used calling channels in the same connection priority rank as that of the first mobile terminal is larger than the number of calling channels set to the rank, disconnecting said call;
        (d-2) when the number of currently-used calling channels in the same connection priority rank as that of the first mobile terminal is smaller than the number of calling channels set to the rank, searching for the rank in which the number of currently-used calling channels is larger than the set number of calling channels in the order of the lowest rank of the respective connection priority ranks set in the area in which the first mobile terminal is positioned; and
        (d-3) selecting a second mobile terminal belonging to the first corresponding rank to hand off the second mobile terminal to another area, and allocating a calling channel to the first mobile terminal to establish calling.

2. The communication method according to claim 1, wherein when a second mobile terminal cannot be handed off, a call of the second mobile terminal is disconnected.

3. The communication method according to claim 1, wherein said congestion state is a state that all currently-usable calling channels in said area are in use.

4. The communication method according to claim 1, wherein said area is part of a zone in which a base station communicates with a mobile terminal.

5. The communication method according to claim 1, wherein a base station receives a call from a mobile terminal, and a base control station controlling one or more base stations controls calling based on the connection priority rank of said call and the congestion state of said area.

6. A mobile terminal communication method comprising the steps of:
    (a) setting a connection priority rank to each mobile terminal to store the same;
    (b) when a first calling mobile terminal belongs to the highest connection priority rank, allocating a calling channel to establish calling;
    (c) when said first mobile terminal is not in the highest connection priority rank, deciding whether a base station which has received a call is in a congestion state or not;
    (d) when not being in the congestion state, allocating a calling channel to establish calling;
    (e) when being in the congestion state, when said first calling mobile terminal is in the lowest connection priority rank, disconnecting the call;
    (f) searching for a base station which is adjacent said base station which has received the call and is not in the congestion state, when there is no corresponding base station, disconnecting the call, and when there is a corresponding base station, permitting use of an available channel of the base station; and (g) when there is not the available channel, allocating a calling channel of a second mobile terminal having the longest call in a zone of said adjacent base station to said first mobile terminal.

7. The communication method according to claim 6, wherein said second mobile terminal having the longest call is moved to another calling channel.

8. The communication method according to claim 6, wherein said congestion state is a state that all currently-usable calling channels except for the number of the calling channels in the highest connection priority rank in one base station are in use.

9. The communication method according to claim 6, wherein a base station receives a call from a mobile terminal, and a base control station controlling one or more base stations controls calling based on the connection priority rank of said call and the congestion state of the base station.

* * * * *